United States Patent
Lee et al.

(10) Patent No.: US 12,321,637 B2
(45) Date of Patent: Jun. 3, 2025

(54) DATA STORAGE DEVICE FOR GUARANTEEING THAT SYSTEM RESOURCES MEET PERFORMANCE REQUIREMENTS, METHOD OF OPERATING THE SAME, AND MEMORY CONTROLLER FOR THE SAME

(71) Applicant: SK hynix Inc., Icheon-si (KR)

(72) Inventors: Seon Ju Lee, Icheon-si (KR); Seung Geol Baek, Icheon-si (KR); Jae Hyun Yoo, Icheon-si (KR); Dong Kyu Lee, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 78 days.

(21) Appl. No.: 18/077,864

(22) Filed: Dec. 8, 2022

(65) Prior Publication Data

US 2024/0012578 A1    Jan. 11, 2024

(30) Foreign Application Priority Data

Jul. 8, 2022   (KR) .......................... 10-2022-0084278

(51) Int. Cl.
    *G06F 3/06*    (2006.01)
(52) U.S. Cl.
    CPC .......... *G06F 3/0659* (2013.01); *G06F 3/0656* (2013.01); *G06F 3/0658* (2013.01); *G06F 3/0679* (2013.01); *G06F 3/0604* (2013.01)

(58) Field of Classification Search
    CPC .... G06F 3/0659; G06F 3/0656; G06F 3/0658; G06F 3/0679; G06F 3/0604; G06F 3/061; G06F 3/614; G06F 2212/1016; G06F 2212/1032
    See application file for complete search history.

(56) References Cited

U.S. PATENT DOCUMENTS

| | | | |
|---|---|---|---|
| 8,665,725 B2 | 3/2014 | Kwan et al. | |
| 10,817,446 B1* | 10/2020 | Saxena | G06F 13/1673 |
| 11,836,380 B2* | 12/2023 | Maharana | G06F 13/1668 |
| 2017/0351452 A1* | 12/2017 | Boyd | G06F 3/0611 |
| 2020/0004445 A1* | 1/2020 | Benisty | G06F 3/0664 |
| 2022/0350506 A1* | 11/2022 | Gafni | G06F 3/0659 |
| 2023/0016020 A1* | 1/2023 | Kim | G06F 3/0658 |
| 2024/0004561 A1* | 1/2024 | Benisty | G06F 3/0631 |

FOREIGN PATENT DOCUMENTS

KR   100629867 B1   9/2006

* cited by examiner

*Primary Examiner* — Curtis James Kortman
(74) *Attorney, Agent, or Firm* — WILLIAM PARK & ASSOCIATES LTD.

(57) ABSTRACT

A data storage device may include a plurality of system resources, a buffer memory device and a memory controller. The buffer memory device may include a buffer memory allotted to the system resources. The memory controller may allocate the buffer memory based on performance requirements that are set in each of the system resources.

18 Claims, 10 Drawing Sheets

DATA STORAGE DEVICE FOR GUARANTEEING THAT SYSTEM RESOURCES MEET PERFORMANCE REQUIREMENTS, METHOD OF OPERATING THE SAME, AND MEMORY CONTROLLER FOR THE SAME

CROSS-REFERENCES TO RELATED APPLICATION

The present application claims priority under 35 U.S.C. § 119(a) to Korean application number 10-2022-0084278, filed on Jul. 8, 2022, in the Korean Intellectual Property Office, which is incorporated herein by reference in its entirety.

BACKGROUND

1. Technical Field

Various embodiments generally relate to an electronic device, more particularly, to a data storage device for guaranteeing that system resources meet performance requirements, a method of operating the data storage device and a memory controller for the data storage device.

2. Related Art

A data storage device may be connected with an external device to perform data input/output operations in accordance with requests of the external device.

Recently, a system, which may be capable of processing the requests of a plurality of the external devices by the single data storage device, may have been studied.

In order to provide performances required by the external device, it may be required to manage resources in the data storage.

SUMMARY

According to example embodiments, there may be provided a data storage device. The data storage device may include a plurality of system resources, a buffer memory device and a memory controller. The buffer memory device may include a buffer memory allotted to the system resources. The memory controller may allocate the buffer memory based on performance requirements that are set in each of the system resources.

According to example embodiments, there may be provided a data storage device. The data storage device may include a plurality of system resources, a memory controller and a buffer memory device. The system resources may be independently operated in accordance with set performance requirements. The memory controller may determine performance ratios in accordance with the performance requirements of each of the system resources. The memory controller may be distributed by the performance ratios by the memory controller to be used for the system resources.

According to example embodiments, there may be provided a method of operating a data storage device. In the method of operating the data storage device, at least one external device may set performance requirements in system resources. A memory controller may determine an allocation ratio of a buffer memory in a buffer memory device and the performance requirements. The memory controller may allocate the buffer memory in accordance with the allocation ratios.

According to example embodiments, there may be provided a memory controller. The memory controller may include an external device interface circuit, a memory interface circuit and a resource scheduler. The external device interface circuit may communicate with an external device. The memory interface circuit may communicate with a non-volatile memory device. The resource scheduler may allot a buffer memory, which may be used for at least one of the external device interface circuit and the non-volatile memory device, based on a performance requirement that is set in at least one of the external device interface circuit and the non-volatile memory device.

BRIEF DESCRIPTION OF THE DRAWINGS

The above and another aspects, features and advantages of the subject matter of the present disclosure will be more clearly understood from the following detailed description taken in conjunction with the accompanying drawings, in which.

DETAILED DESCRIPTION

Various embodiments of the present invention will be described in greater detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present invention as defined in the appended claims.

The present invention is described herein with reference to cross-section and/or plan illustrations of idealized embodiments of the present invention. However, embodiments of the present invention should not be construed as limiting the inventive concept. Although a few embodiments of the present invention will be shown and described, it will be appreciated by those of ordinary skill in the art that changes may be made in these embodiments without departing from the principles and spirit of the present invention.

Figure 1:
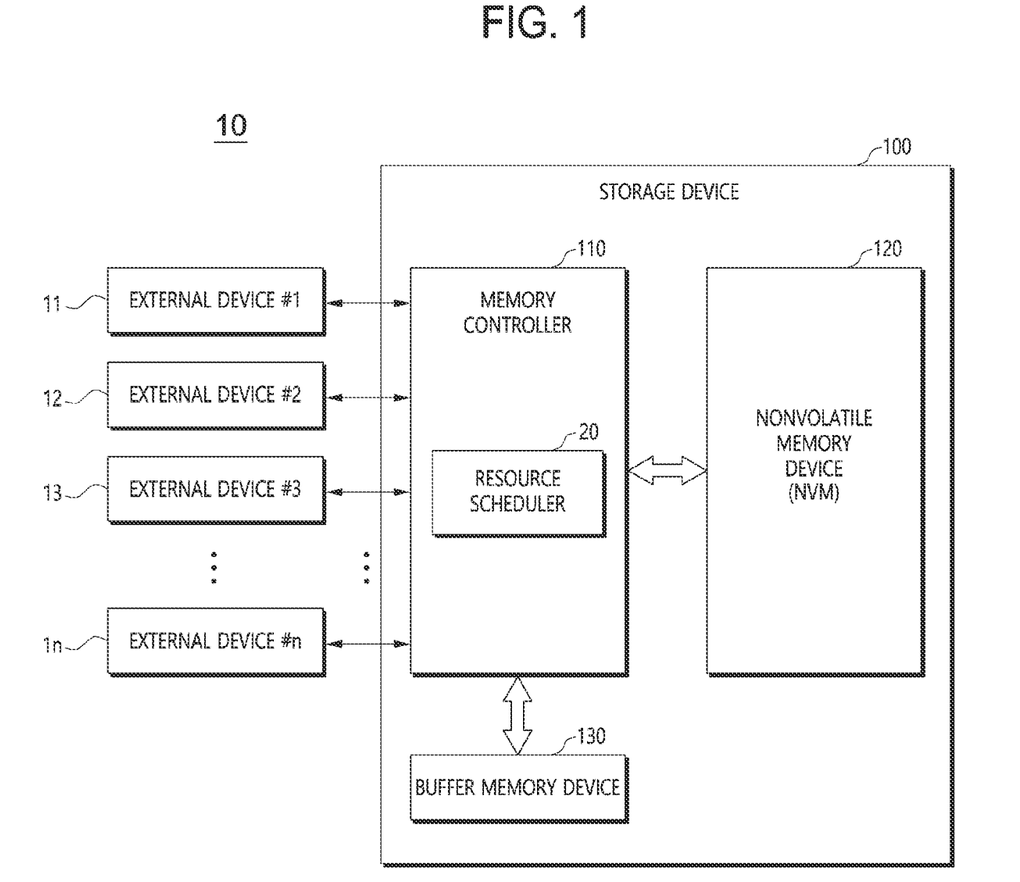
FIG. 1 is a view illustrating a storage system in accordance with example embodiments.

FIG. 1 is a view illustrating a storage system in accordance with example embodiments.

Referring to FIG. 1, a storage system 10 of example embodiments may include a plurality of external devices 11~1n and a data storage device 100. The storage system 10 may include various information processing devices, such as a personal computer, a laptop computer, a server, a workstation, a smart phone, a tablet PC, etc.

In example embodiments, each of the external devices 11~1n may be operated independently or dependently to access the data storage device 100. Each of the external devices 11~1n may include processors configured to process the same application or different applications.

The data storage device 100 may be operated by each of the external devices 11~1n. In example embodiments, the data storage device 100 may include a memory controller 110, a non-volatile memory device (NVM) 120, and a buffer memory device 130.

The memory controller 110 may store data in the non-volatile memory device 120 or provide the external devices 11~1n with the data in the non-volatile memory device 120 by the external devices 11~1n.

The non-volatile memory device 120 may include a NAND flash memory, a NOR flash memory, a phase-change RAM (PRAM), a resistive RAM (ReRAM), a ferroelectric RAM (FRAM), a spin torque transfer magnetic RAM (STT-MRAM), etc. The non-volatile memory device 120 may include a plurality of dies, a plurality of chips or a plurality of packages. A memory cell in the non-volatile memory device 120 may be operated in a single level cell configured to store a bit of data in one memory cell or a plurality of bits of data in one memory cell.

The buffer memory device 130 may act as a space in which the data is temporarily stored when the data storage device 100 performs an operation, such as a write operation or a read operation, interlocked with the external devices 11~1n. FIG. 1 may show the buffer memory device 130 arranged outside of the memory controller 110. Alternatively, the buffer memory device 130 may be arranged in the memory controller 110.

The data storage device 100 may be configured to aid a multiple-host or a multiple-tenant.

Each of the external devices 11~1n may require a specific performance with respect to the data storage device 100. The data storage device 100 may allot at least one system resource in the data storage device 100 so that at least one of the external devices 11~1n may be dedicated to the system resource. The system resource may include an interface resource, such as an input/output device, a memory resource, such as the non-volatile memory device 120, etc.

At least one application that is performed in at least one of the external devices 11~1n or at least one application that is performed in each of the external devices 11~1n may request the data storage device 100 to dedicate at least one of the system resources. The application may set a performance requirement with respect to the used system resource.

In example embodiments, the performance of the system resource may include a throughput or a quality of service. For example, the performance of the system resource may include an input/output bandwidth with respect to the external devices 11~1n.

The memory controller 110 may include a resource scheduler 20. The resource scheduler 20 may guarantee that the system resources, allotted to the external devices 11~1n, meet the performance requirements of the external devices 11~1n.

The resource scheduler 20 may allocate storage space in the buffer memory device 130 based on the performance requirements that are set in the system resources. In order to overcome a difference between data transmission speeds between electronic devices, for example, the external devices 11~1n and the storage system 10, the buffer memory device 130 may be used. The buffer memory device 130 may include a buffer memory pool configured to temporarily store data that is related to the external devices 11~1n or an application that is performed in the external devices.

According to example embodiments, the resource scheduler 20 may allocate the buffer memory device 130 so that the system resources, allotted to the external devices 11~1n, satisfies the performance requirements of the external devices 11~1n, thereby guaranteeing the performance requirements of the external devices 11~1n, for example, a minimum bandwidth.

Figure 2:
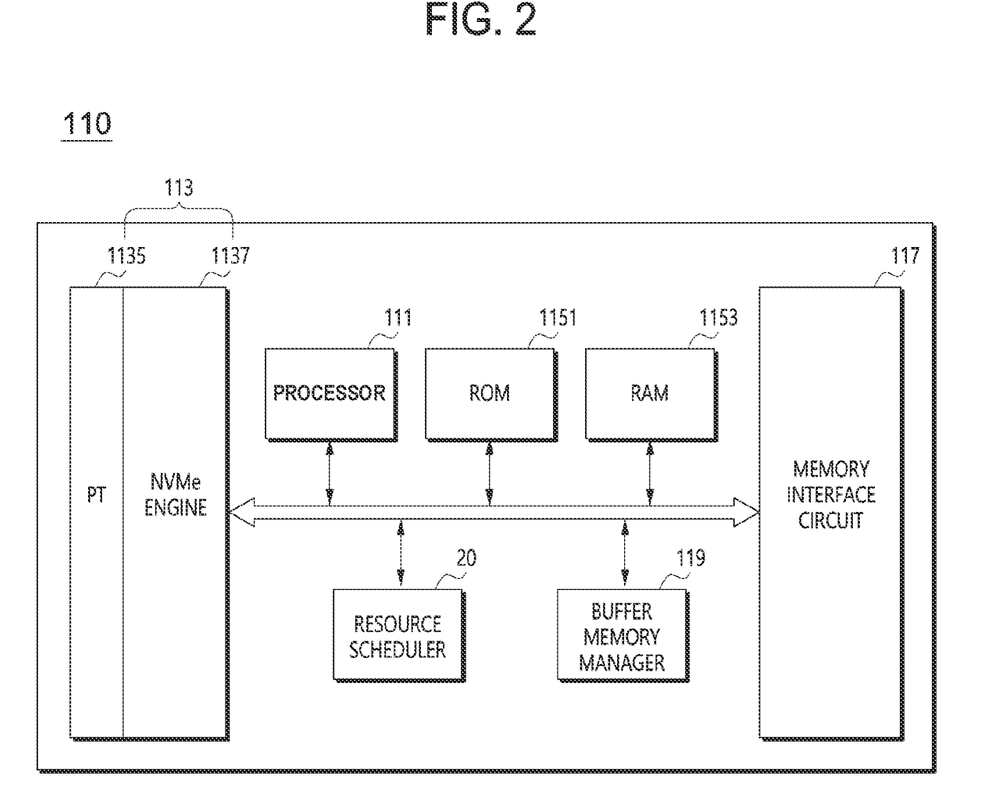
FIG. 2 is a view illustrating a memory controller in accordance with example embodiments.

FIG. 2 is a view illustrating a memory controller in accordance with example embodiments.

Referring to FIG. 2, the memory controller 110 may include a processor 111, a host interface circuit 113, a ROM 1151, a RAM 1153, a memory interface circuit 117, a buffer memory manager 119 and a resource scheduler 20.

The processor 111 may provide the host interface circuit 113, the RAM 1153, the memory interface circuit 117, the buffer memory manager 119 and the resource scheduler 20 with various control information that is required for a read operation or a write operation of data with respect to the non-volatile memory device 120. In example embodiments, the processor 111 may be operated in accordance with a firmware that is provided for various operations of the data storage device 100. The processor 111 may perform a function of a flash transition layer (FTL) for managing the non-volatile memory device 120, for example, a garbage collection, an address mapping, a wear leveling, etc. The processor 111 may include a combination of a hardware and a software that is operated on the hardware.

The host interface circuit 113 may include an external device interface circuit. The host interface circuit 113 may receive a command and a clock signal from the external devices 11~1n by the processor 111. The host interface circuit 113 may provide a communication channel for controlling the data input/output. The host interface circuit 113 may provide a physical connection between the external devices 11~1n and the data storage device 100. The host interface circuit 113 may interface with the data storage device 100 corresponding to a bus format of the external devices 11~1n. The bus format may include at least one of a universal serial bus (USB) protocol, a multi-media card (MMC) protocol, a peripheral component interconnection (PCI) protocol, a PCI-express protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a private protocol, etc.

The ROM 1151 may store a program code that is required for operating the memory controller 110, for example, the firmware or the software, and code data that is used by the program codes.

The RAM 1153 may store data that is required for operating the memory controller 110 or data generated by the memory controller 110. For example, the RAM 1153 may include an SRAM. The RAM 1153 may be used as a buffer memory, an operation memory, or a cache memory of the memory controller 110.

The memory interface circuit 117 may provide a communication channel for transmitting a signal between the memory controller 110 and the non-volatile memory device 120. The memory interface circuit 117 may register the data, which may be temporarily stored in the buffer memory device 130, in the non-volatile memory device 130 by the processor 111. The memory interface circuit 117 may transmit the data read from the non-volatile memory device 120.

The buffer memory manager 119 may allot or release regions in the buffer memory device 130 for temporarily storing the data in the buffer memory device 130.

In example embodiments, the host interface circuit 113 may include at least one physical port (PT) 1135 and at least one Non-volatile memory express (NVMe) engine 1137.

The physical port 1135 may be a physical layer configured to aid a PCI-express interface.

The Non-volatile memory express (NVMe) engine 1137 may include a hardware, a software or a combination thereof for providing at least one a physical function (PF) that is defined by a Non-volatile memory express (NVMe) interface standard. The Non-volatile memory express (NVMe) engine 1137 may include a Non-volatile memory express (NVMe) controller for aiding the PCI-express function. Hereinafter, the Non-volatile memory express (NVMe) engine 1137, the physical function and the Non-volatile memory express (NVMe) controller may have substantially the same meaning.

The physical function PF may be a PCI-express function for aiding at least one virtual function by the physical function. The physical function PF may correspond to at least one of the external devices 11~1n. The physical function PF may process a command with respect to a corresponding external device.

The resource scheduler 20 may have a software, a hardware, or a combination of a software that is operated on the hardware. For example, the resource scheduler 20 may have the hardware included in the host interface circuit 113 or the Non-volatile memory express (NVMe) engine 1137. The resource scheduler 20 may have the software included in the ROM 1151 that is processed by the processor 111.

Figure 3:
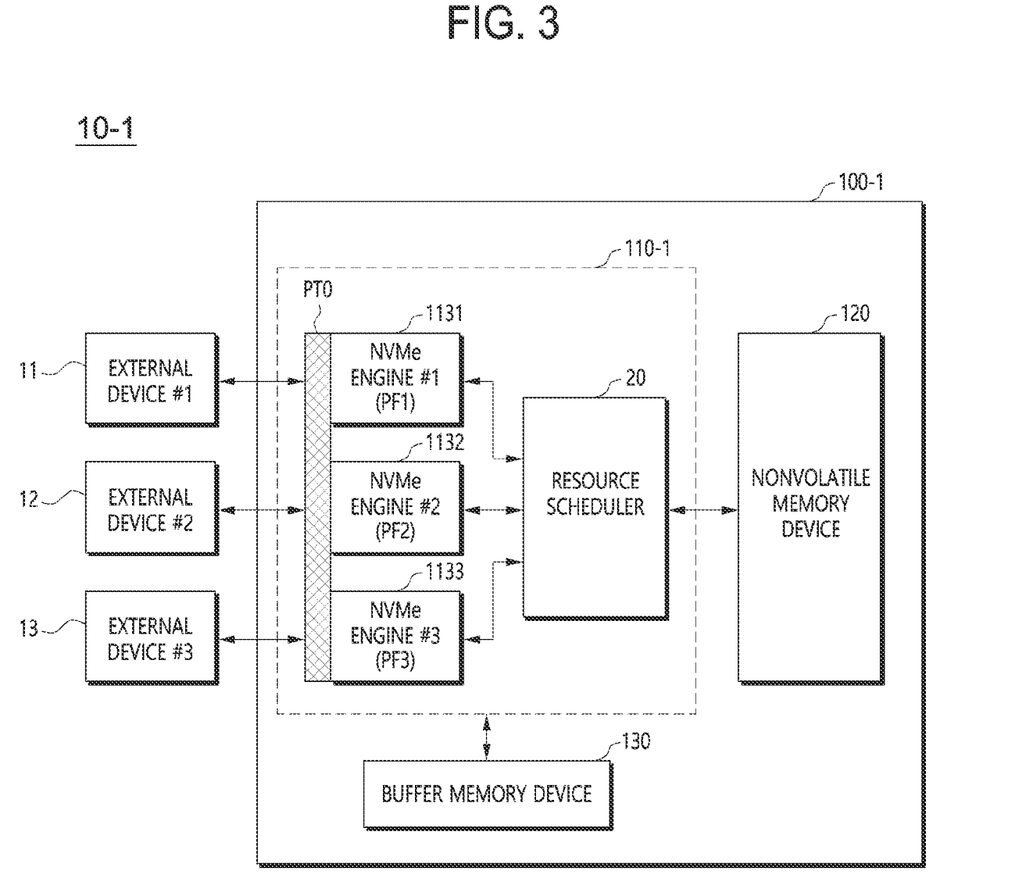
FIG. 3 is a view illustrating an interface resource of a data storage device in accordance with example embodiments.
Figure 4:
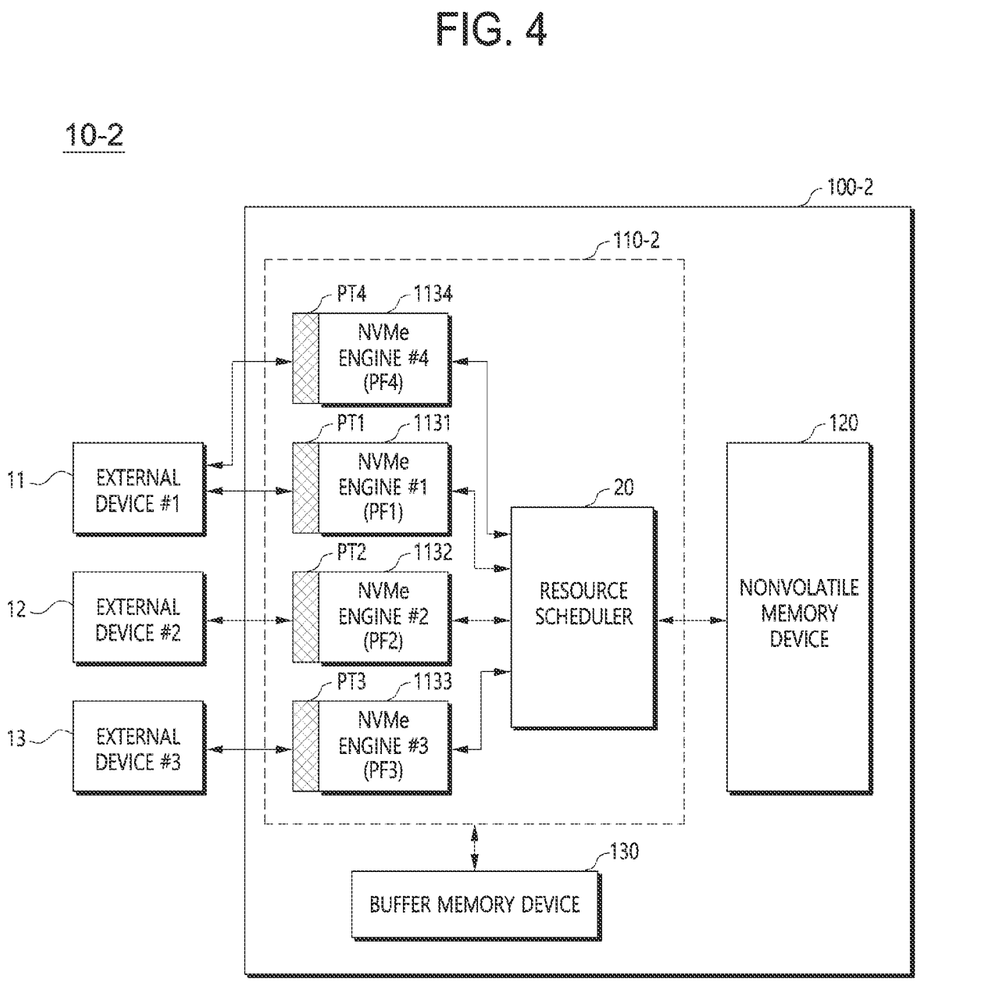
FIG. 4 is a view illustrating an interface resource of a data storage device in accordance with example embodiments.

FIGS. 3 and 4 are views illustrating an interface resource of a data storage device in accordance with example embodiments.

Referring to FIG. 3, a storage system 10-1 may include first to third external devices 11~13 and a data storage device 100-1.

Each of the first to third external devices 11~13 may output commands for processing required operations.

The data storage device 100-1 may include a memory controller 110-1, a non-volatile memory device 120, and a buffer memory device 130. The memory controller 110-1 may include a physical port PT0, a plurality of Non-volatile memory express (NVMe) engines 1131~1133, and a resource scheduler 20.

The data storage device 100-1 may communicate with the first to third external devices 11~13 through an interface, such as a Non-volatile memory express (NVMe) over PCI-express through a physical layer based on a PCI-express interface or an interface, such as a Non-volatile memory express (NVMe)-oF, a Non-volatile memory express (NVMe) over fabrics based on a network such as a fiber channel, a remote direct random access memory (RDRAM), etc.

The data storage device 100-1 may communicate with the first to third external devices 11~13 through various physical layers. The first to third physical functions PF1~PF3 may correspond to the first to third external devices 11~13, respectively. For example, the first physical function PF1 may communicate with the first external device 11. The first physical function PF1 may be a first Non-volatile memory express (NVMe) controller 1131 configured to process a command from the first external device 11. The second physical function PF2 may communicate with the second external device 12. The second physical function PF2 may be a second Non-volatile memory express (NVMe) controller 1132 configured to process a command from the first second external device 12. The third physical function PF3 may communicate with the third external device 13. The third physical function PF3 may be a third Non-volatile memory express (NVMe) controller 1133 configured to process a command from the third external device 13.

The first to third physical functions PF1~PF3 may perform operations with respect to the non-volatile memory device 120 based on the command from the external device.

In examples of embodiments, the first to third Non-volatile memory express (NVMe) engines 1131~1133 may be interface resources corresponding to the external devices 11~13, respectively.

The resource scheduler 20 may independently allot the buffer memory device 130, which may be required for operating the first to third physical functions PF1~PF3, to the first to third physical functions PF1~PF3 based on the performance requirements that are set by the external devices 11~13 corresponding to the first to third physical functions PF1~PF3.

In example embodiments, the resource scheduler 20 may manage a storage space in the buffer memory device 130, which may be required for processing the command of the external device by the physical functions PF1~PF3, as a buffer memory pool. The resource scheduler 20 may allocate the storage space in the buffer memory pool in accordance with performance requirement ratios of the external devices with respect to the physical functions PF1~PF3. The allocated storage space may be independently occupied or dedicated by each of the physical functions PF1~PF3. The resource scheduler 20 may allot the storage space allocated by the physical functions PF1~PF3 by a uniform gap for a set time. Hereinafter, the allocation of the storage space may be independently classifying the storage space of the buffer memory pool based on the system resources. The allotment of the storage space may be converting the allocated storage space into available state by the corresponding physical function.

As shown in FIG. 3, the first to third physical functions PF1~PF3 may communicate with the first to third external devices 11~13 through one physical port PT0.

The physical port PT0 may be a physical layer for aiding the PCI-express interface. In example embodiments, each of the first to third physical functions PF1~PF3 may aid at least one virtual function dependent on it.

Referring to FIG. 4, a storage system 10-2 may include first to third external devices 11~13 and a data storage device 100-2.

The data storage device 100-2 may include a memory controller 110-2, a non-volatile memory device 120 and a buffer memory device 130. The memory controller 110-2 may include a plurality of physical ports PT1~PT4, a plurality of Non-volatile memory express (NVMe) engines 1131~1134 and a resource scheduler 20.

The data storage device 100-2 may communicate with the first to third external devices 11~13 through the physical ports PT1~PT4. The first to fourth physical functions PF1~PF4 may communicate with the first to third external devices 11~13 through the physical ports PT1~PT4.

Each of the first to third physical ports PT1~PT3 may be an independent physical layer for aiding the PCI-express interface. The first physical function PF1 may communicate with the first external device 11 through the first physical port PT1. The second physical function PF2 may communicate with the second external device 12 through the second physical port PT2. The third physical function PF3 may communicate with the third external device 13 through the third physical port PT3.

In example embodiments, the at least one external device, for example, the first external device 11 may communicate with the physical functions PF1 and PF4. The fourth physical function PF4 may communicate with the first external device 11 through the fourth physical port PT4. The fourth physical function PF4 may be the fourth Non-volatile memory express (NVMe) controller 1134 configured to process the command from the first external device 11.

That is, the first to fourth Non-volatile memory express (NVMe) engines 1131~1134 may be interface resources corresponding to the external devices 11~13, respectively.

The resource scheduler 20 may independently allot the buffer memory device 130, which may be required for operating the first to fourth physical functions PF1~PF4, to the first to fourth physical functions PF1~PF4 based on the performance requirements that are set by the external devices 11~13 corresponding to the first to fourth physical functions PF1~PF4.

In example embodiments, the resource scheduler 20 may manage a storage space in the buffer memory device 130, which may be required for processing the command of the external device by the physical functions PF1~PF4, as a buffer memory pool. The resource scheduler 20 may allocate the storage space in the buffer memory pool in accordance with performance requirement ratios of the external devices with respect to the physical functions PF1~PF4. The allocated storage space may be independently or solely occupied by the physical functions PF1~PF4.

In FIGS. 3 and 4, the first to fourth Non-volatile memory express (NVMe) controllers 1131~1134 corresponding to the physical port PT0 and the first to fourth physical functions PF1~PF4 may be included in the host interface circuit 113 or embodied on the host interface circuit 113.

Figure 5:
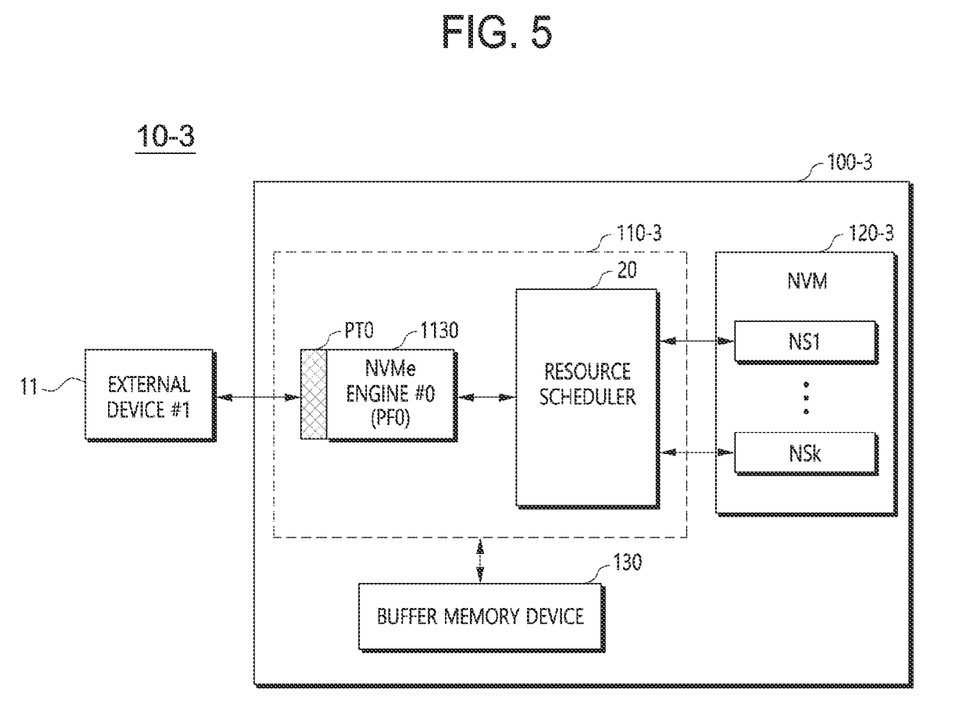
FIG. 5 is a view illustrating an interface resource of a data storage device in accordance with example embodiments.
Figure 6:
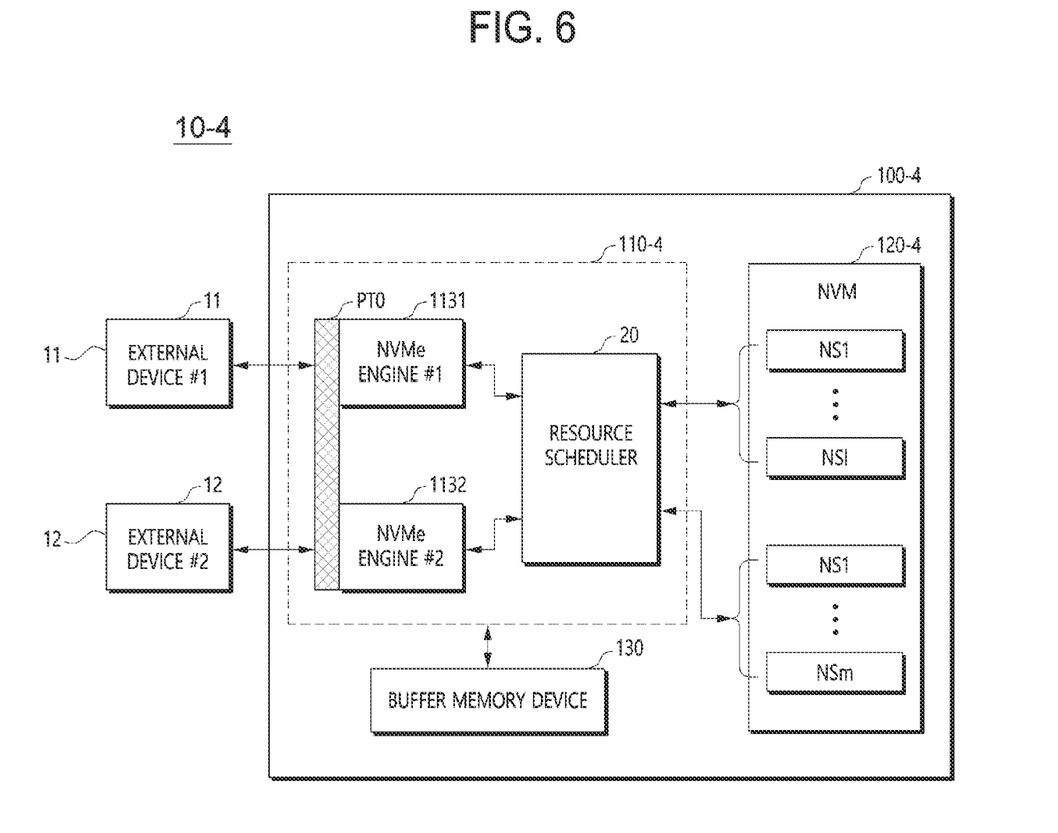
FIG. 6 is a view illustrating an interface resource of a data storage device in accordance with example embodiments.
Figure 7:
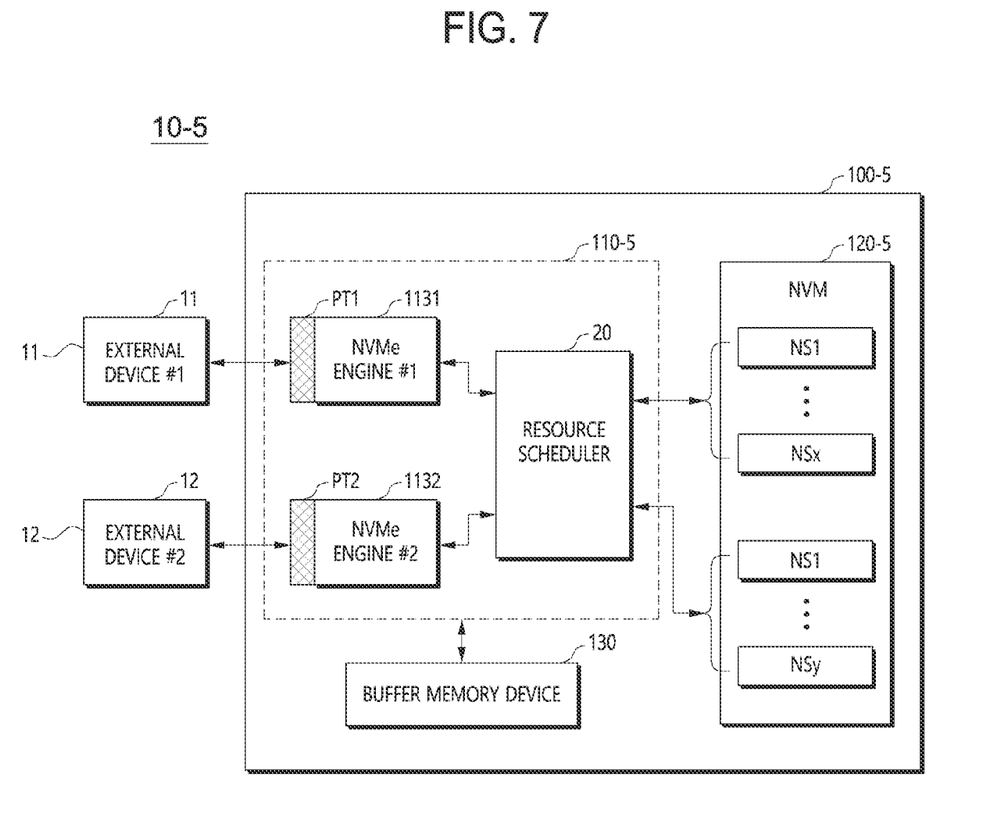
FIG. 7 is a view illustrating an interface resource of a data storage device in accordance with example embodiments.

FIG. 5 is a view illustrating an interface resource of a data storage device in accordance with example embodiments, FIG. 6 is a view illustrating an interface resource of a data storage device in accordance with example embodiments and FIG. 7 is a view illustrating an interface resource of a data storage device in accordance with example embodiments. Various topologies in which at least one external device 11~12 may recognize a non-volatile memory device NVM as a plurality of namespaces NS may be illustrated with reference to FIGS. 5 to 7.

Referring to FIG. 5, a storage system 10-3 may include an external device 11 and a data storage device 100-3.

The data storage device 100-3 may include a memory controller 110-3, a non-volatile memory device 120-3 and a buffer memory device 130. The memory controller 110-3 may include an external device interface circuit and a resource scheduler 20. The external device interface circuit may include a physical port PT0 and a Non-volatile memory express (NVMe) engine 1130.

The external device 11 may communicate with the data storage device 100-3 through the physical port PT0. The Non-volatile memory express (NVMe) engine 1130 may be an interface resource for the external device 11. The non-volatile memory device 120-3 may be a memory resource for the external device 11.

The non-volatile memory device 120-3 may be managed as a namespace NS or a non-volatile memory set NVM set that is physically or logically classified by the memory controller 110-3 in accordance with a request of the external device 11. The namespace NS may be a logically divided storage space of the non-volatile memory device 120-3 to be recognized as a different and separate storage device. The non-volatile memory set NVM set may include the at least one namespace NS and a separate single storage space. However, the separate single storage might not be allotted to a space as the namespace NS. That is, the non-volatile memory device 120-3 may include a plurality of classified namespaces NS1~NSk.

The external device 11 may logically classify the non-volatile memory device 120-3 of the data storage device 100-3 into the namespaces NS1 and NS2. The external device 11 may recognize the namespaces NS1 and NS2. The external device 11 may independently control the logically classified namespaces NS1 and NS2.

The resource scheduler 20 may independently allot the buffer memory device 130, which may be required for operating the namespaces NS1~NSk, based on a performance requirement of the external device 11 by using a part of the namespaces NS1~NSk as the memory resource.

In example embodiments, the resource scheduler 20 may manage the buffer memory device 130, which may be used for processing a command of the external device 11 by the namespaces NS1~NSk, as a buffer memory pool. The resource scheduler 20 may allocate the storage space in the buffer memory pool in accordance with a performance requirement ratio of the external device 11 with respect to the namespaces NS1~NSk. The allocated storage space may be independently or exclusively occupied by the namespaces NS1~NSk. The resource scheduler 20 may allot the allocated storage space with respect to the namespaces NS1~NSk by a uniform gap for a set time.

Referring to FIG. 6, a storage system 10-4 may include a plurality of external devices 11 and 12 and a data storage device 100-4.

The data storage device 100-4 may include a memory controller 110-4, a non-volatile memory device 120-4, and a buffer memory device 130. The memory controller 110-4 may include an external device interface circuit and a resource scheduler 20. The external device interface circuit may include a physical port PT0 and a plurality of Non-volatile memory express (NVMe) engines 1131 and 1132. The Non-volatile memory express (NVMe) engines 1131 and 1132 may be an interface resource that is used for the external devices 11 and 12.

The external devices 11 and 12 may communicate with the data storage device 100-4 through the physical port PT0.

The data storage device 100-4 may include physically classified first and second Non-volatile memory express (NVMe) engines 1131 and 1132. The first and second Non-volatile memory express (NVMe) engines 1131 and 1132 as an interface resource may communicate with the external devices 11 and 12 through the single physical port PT0.

The non-volatile memory device 120-4 may be managed as namespaces NS1~NSl and NS1~NSm that are physically classified by the memory controller 110-4 in accordance with a request of the external device 11.

The first and second external devices 11 and 12 may recognize the non-volatile memory device 120-4 corresponding to the memory resource as the independent namespaces NS1~NSl and NS1~NSm. The first Non-volatile memory express (NVMe) engine 1131 may receive a command of the first external device 11 to perform an operation with respect to the namespaces NS1~NSl of the non-volatile memory device 120-4. The second Non-volatile memory express (NVMe) engine 1132 may receive a command of the second external device 12 to perform an operation with respect to the namespaces NS1~NSm of the non-volatile memory device 120-4.

The namespaces NS1~NSl that are recognized by the first external device 11 may be physically distinguish from the namespaces NA1~NSm that are recognized by the second external device 12. That is, the namespaces NS1~NSl may be a memory resource that is used for the first external device 11 and the namespaces NS1~NSm may be a memory resource that is used for the second external device 12.

The resource scheduler 20 may independently allot the buffer memory device 130, which may be required for operating the namespaces NS1~NSl and NS1~NSm, based on performance requirements of the external devices 11 and 12 by using a part of the namespaces NS1~NSl and NS1~NSm as the memory resource.

In example embodiments, the resource scheduler 20 may allocate the storage space in the buffer memory device 130 in accordance with a performance requirement ratio of the external device with respect to the namespaces NS1~NSl and NS1~NSm. The allocated storage space may be independently or exclusively occupied by the namespaces NS1~NSl and NS1~ and NSm. The resource scheduler 20 may allot the allocated storage space with respect to the namespaces NS1~NSl and NS1~NSm by a uniform gap for a set time.

In example embodiments, the first and second external devices 11 and 12 may include different cores or different processors.

Referring to FIG. 7, a storage system 10-5 may include a plurality of external devices 11 and 12 and a data storage device 100-5.

The data storage device 100-5 may include a memory controller 110-5, a non-volatile memory device 120-5, and a buffer memory device 130. The memory controller 110-5 may include an external device interface circuit and a resource scheduler 20. The external device interface circuit may include a plurality of physical ports PT1 and PT2 and a plurality of Non-volatile memory express (NVMe) engines 1131 and 1132. The Non-volatile memory express (NVMe) engines 1131 and 1132 may be an interface resource that is used for the external devices 11 and 12. The non-volatile memory device 120-5 may be a memory resource that is used for the external devices 11 and 12.

The data storage device 100-5 may communicate with the external devices 11 and 12 through physical ports PT1 and PT2.

The non-volatile memory device 120-5 may be managed as namespaces NS1~NSx and NS1~NSy that are physically classified by the memory controller 110-5 in accordance with a request of the external devices 11 and 12.

The first and second external devices 11 and 12 may recognize the non-volatile memory device 120-5 as the independent namespaces NS1~NSx and NS1~NSy. The first Non-volatile memory express (NVMe) engine 1131 may receive a command of the first external device 11 through the first physical port PT1 to perform an operation with respect to the namespaces NS1~NSx of the non-volatile memory device 120-5. The second Non-volatile memory express (NVMe) engine 1132 may receive a command of the second external device 12 to perform an operation with respect to the namespaces NS1~NSy of the non-volatile memory device 120-5.

That is, the first physical port PT1 and the first Non-volatile memory express (NVMe) engine 1131 may be an interface source that is used for the first external device 11. The namespaces NS1~NSx may be a memory resource that is used for the first external device 11. The second physical port PT2 and the second Non-volatile memory express (NVMe) engine 1132 may be an interface source that is used for the second external device 12. The namespaces NS1~NSy may be a memory resource that is used for the second external device 12.

The resource scheduler 20 may manage the buffer memory device 130, which may be required for processing the command of the external devices 11 and 12 by the namespaces NS1~NSx and NS1~NSy, as a buffer memory pool. The resource scheduler 20 may allocate the storage space in the buffer memory pool in accordance with performance requirements ratio of the external devices 11 and 12 with respect to the namespaces NS1~NSx and NS1~NSy. The allocated storage space may be independently or exclusively occupied by the namespaces NS1~NSx and NS1~NSy. The resource scheduler 20 may allot the allocated storage space with respect to the namespaces NS1~NSx and NS1~NSy by a uniform gap for a set time.

Figure 8:
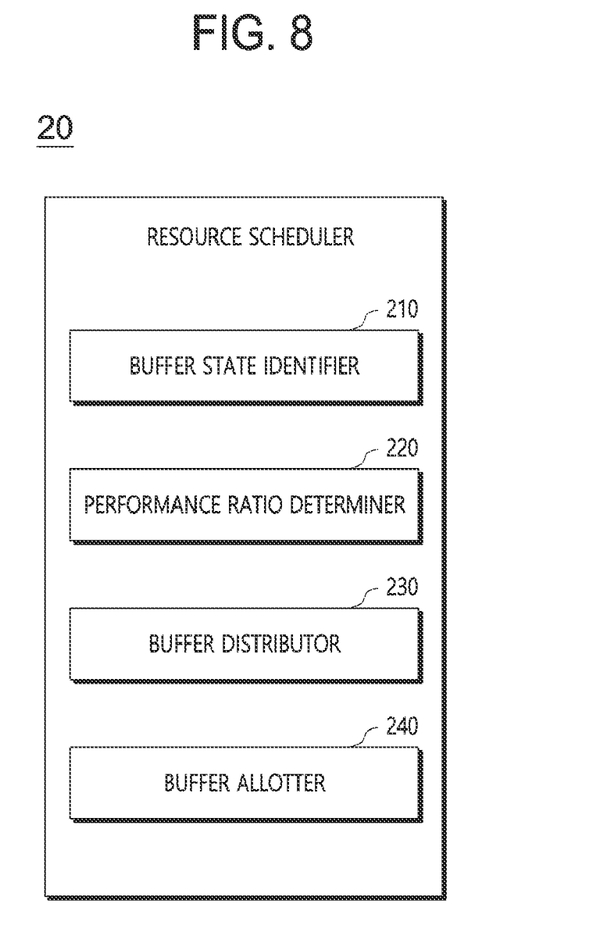
FIG. 8 is a view illustrating a resource scheduler in accordance with example embodiments.

FIG. 8 is a view illustrating a resource scheduler in accordance with example embodiments.

Referring to FIG. 8, a resource scheduler 20 of example embodiments may include a buffer state identifier 210, a performance ratio determiner 220, a buffer allocator 230, and a buffer allotter 240.

The buffer state identifier 210 may manage a storage space, which may be required for processing a command of an external device by each of system resources among the storage spaces in the buffer memory device 130, as a buffer memory pool.

A data storage device may have a fresh out-of-the-box (FOB) state or a sustain state. The FOB state may be a new product state. The sustain state may be a state after using the new product, for example, a state requiring a garbage collection whenever a request of an external device may be received. A performance requirement of a system resource in the sustain state may be lower than that in the FOB state. That is, an amount of a buffer memory that is allotted to the system resource in the sustain state may be decreased. The buffer state identifier 210 may control the amount of the buffer memory that is registered in the buffer memory pool to contribute to the system resource in accordance with the FOB state or the sustain state of the data storage device.

A relatively small amount buffer memory may be required in the sustain state. Thus, the memory controller 110 of the data storage device 100 may control the buffer memory space, which might not contribute to the system resource, to not be used in the garbage collection.

The performance ratio determiner 220 may determine requirement ratios based on the performance requirements that are set by the external device corresponding to the system resources.

For example, when first to fourth system resources are used for first to fourth external devices, the performance ratio determiner 220 may calculate the performance requirements by ratios of the system resources with respect to a total performance requirement.

The buffer allocator 230 may allocate the storage space in the buffer memory pool by the buffer state identifier 210 in accordance with the performance rations based on the system resources. The allocated storage spaces may be independently or solely occupied by each of the system resources. The allocation of the storage spaces may be independently classifying the storage spaces of the buffer memory pool based on the system resources.

The buffer allotter 240 may allot the allocated storage spaces with respect to each of the system resources by a uniform gap for a set time. The allotment of the storage space may convert the allocated storage space into an available state based on the system resource.

For example, when 100 buffers are allocated to a first system resource and 80 buffers may be allocated to a second system resource, a time limit allowed to a buffer allotment may be 10 ms. For conveniences of explanations, a unit buffer slot may be referred to as 1 buffer.

The buffer allotter 240 may allot one buffer memory every 0.1 ms [10 ms/100=0.1 ms] with respect to the first system resource. Further, the buffer allotter 240 may allot one buffer memory every 0.125 ms [10 ms/80=0.125 ms] with respect to the second system resource.

A buffer allotment period, based on the system resource, may be uniformly controlled to prevent the buffer memory of the system resource from being concentrated on a specific command of the external device, thereby decreasing service latency.

Figure 9:
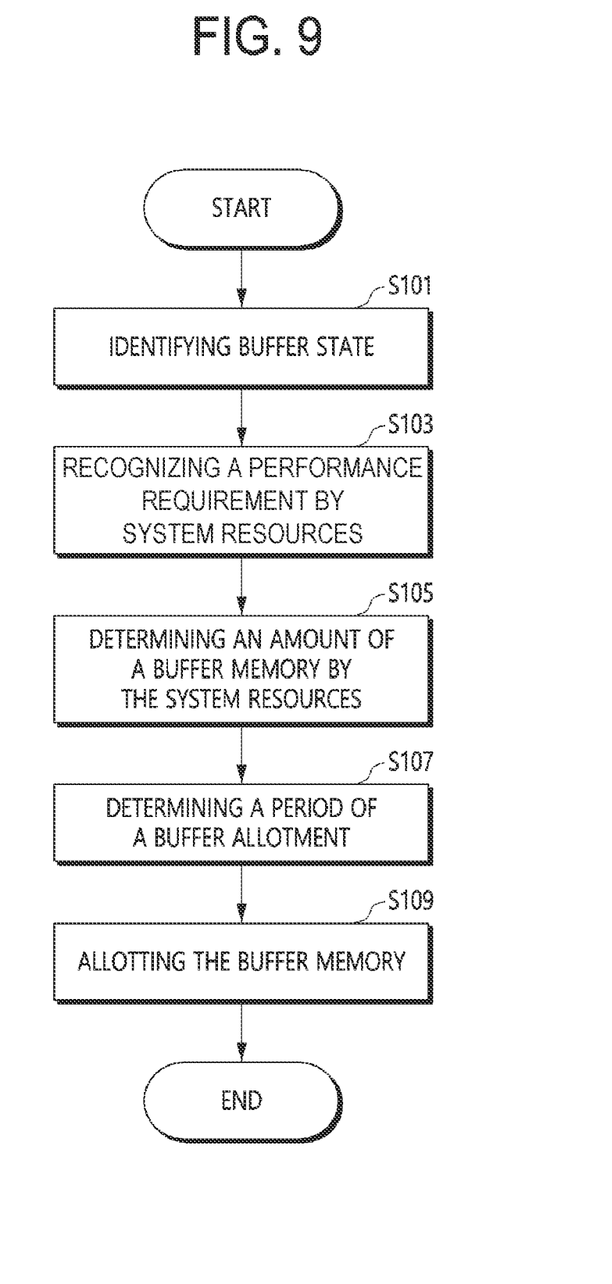
FIG. 9 is a flow chart illustrating a method of operating a data storage device in accordance with example embodiments.

FIG. 9 is a flow chart illustrating a method of operating a data storage device in accordance with example embodiments.

Referring FIG. 9, in step S101, the memory controller 110 of the data storage device 100 may manage the storage space, which may be required for processing the command of the external device by each of the system resources, among the storage spaces in the buffer memory device 130 as the buffer memory pool.

The data storage device may be converted into the sustain state in which the garbage collection may be performed whenever the request of the external device may be received. The performance that is required for the system resource by the external device in the sustain state may be lower than that in the new product state. The amount of the buffer memory that is allotted to the system resource in the sustain state may be decreased. The memory controller 110 may control the amount of the buffer memory that is registered in the buffer memory pool in accordance with the new product state or the sustain state of the data storage device to contribute to the system resource.

The memory controller 110 may control the buffer memory space, which might not be used in the system resource, to be used for the garbage collection of the non-volatile memory device 120.

In step S103, the memory controller 110 may determine the performance ratios based on the performance requirement set by the external devices corresponding to the system resources.

In step S105, the memory controller 110 may allocate the storage spaces in the buffer memory pool in accordance with the performance ratios. The allocated storage spaces may be independently or solely occupied by the system resources.

In step S107, the memory controller 110 may determine the allotment period with respect to the storage spaced allocated to the system resources.

In step S109, the memory controller 110 may allot the buffer memory based on the system resources in accordance with the determined period.

Figure 10:
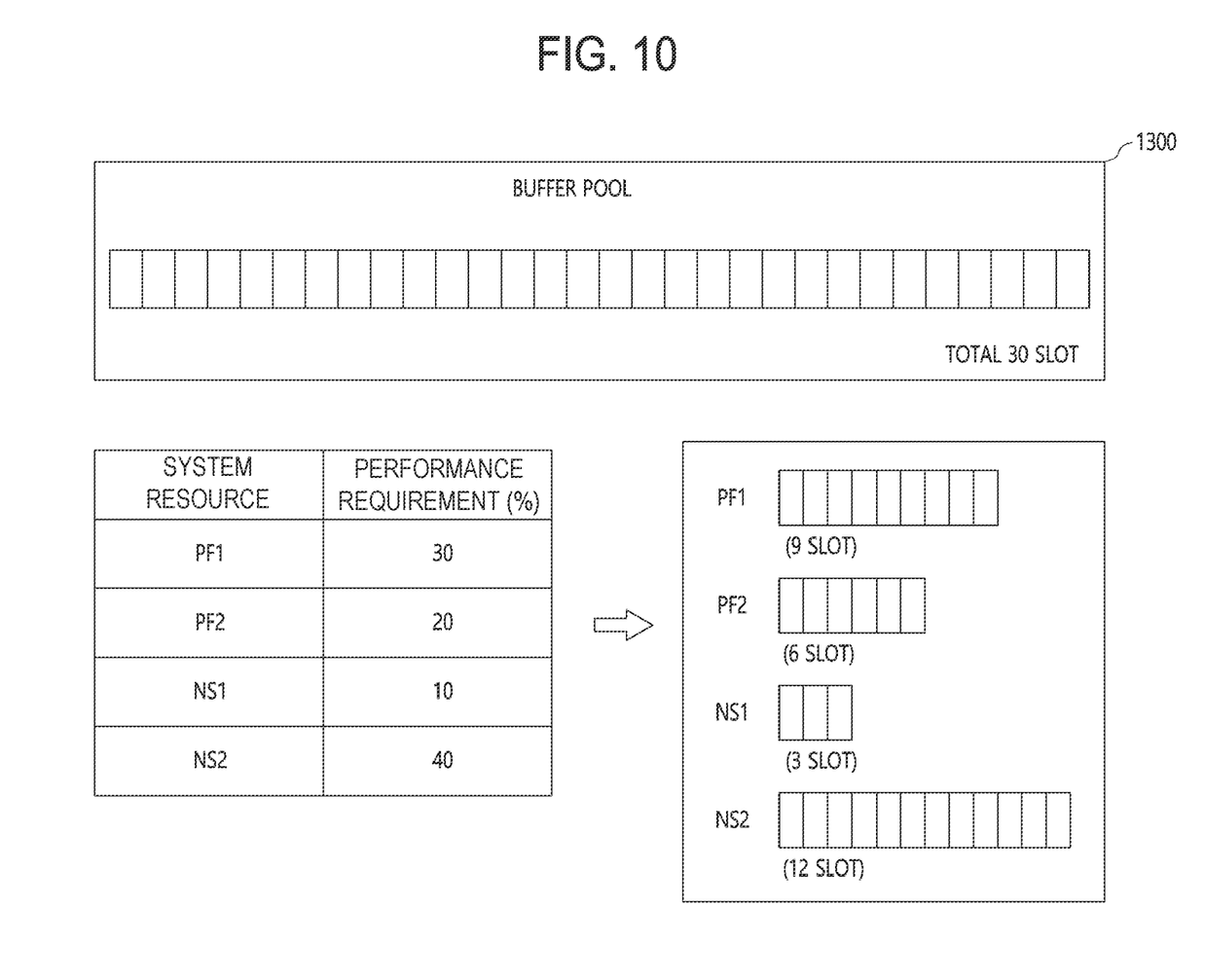
FIG. 10 is a view illustrating an operation for allocating a buffer memory by system resources in accordance with example embodiments.

FIG. 10 is a view illustrating an operation for allocating a buffer memory by system resources in accordance with example embodiments.

Referring to FIG. 10, the resource scheduler 20 may form the buffer memory pool 1300. The resource scheduler 20 may allot the buffer memory based on the system resources.

When the system resource includes a first physical function PF1, a second physical function PF2, a first namespace NS1 and a second namespace NS2, a performance requirement of the first physical function PF1 may be about 30%, a performance requirement of the second physical function PF2 may be about 20%, a performance requirement of the first namespace NS1 may be about 10%, a performance requirement of the second namespace NS2 may be about 40%.

The resource scheduler 20 may allocate 30 slots in the buffer memory pool 1300 to 9 slots in the first physical function PF1, 6 slots in the second physical function PF2, 3 slots in the first namespace NS1, and 12 slots in the second namespace NS2.

The buffer memory that is allocated to the system resources may be allotted by the uniform gap for the set time.

According to example embodiments, the buffer memory that is required for operating the system resource may be allocated in accordance with the performance requirements of the system resources. Thus, the system resources may be uniformly operated in accordance with the performance requirements of the system resources.

The above described embodiments of the present invention are intended to illustrate and not to limit the present invention. Various alternatives and equivalents are possible. The invention is not limited by the embodiments described herein. Nor is the invention limited to any specific type of semiconductor device. Another additions, subtractions, or modifications are obvious in view of the present disclosure and are intended to fall within the scope of the appended claims.

What is claimed is:

1. A data storage device, comprising:
   a plurality of system resources;
   a buffer memory device including a buffer memory comprising a plurality of buffer slots allotted to each of the plurality of system resources; and
   a memory controller configured to allocate a set number of buffer slots based on a performance requirement that is set for each system resource of the plurality of the system resources,
   wherein the memory controller:
   sets a time limit for providing the allocated set number of buffer slots for each of the plurality of system resources, and
   provides the allocated set number of buffer slots to associated system resources at regular intervals within the time limit.

2. The data storage device of claim 1,
   wherein the memory controller allocates the buffer memory of the buffer memory device in accordance with performance requirement ratios of the system resources.

3. The data storage device of claim 1,
   wherein at least one external device is dedicated to the system resources, and
   wherein at least one application in at least one external device requests the system resources to be dedicated or at least one application in each external device requests the system resources to be dedicated.

4. The data storage device of claim 1,
   wherein the system resources comprise interface resources.

5. The data storage device of claim 4,
   wherein each of the interface resources comprises a plurality of non-volatile memory express (NVMe)

engines that communicate with at least one external device through at least one physical port.

6. The data storage device of claim 5,
wherein each of the NVMe engines is physically independent from each other.

7. The data storage device of claim 1, further comprising a non-volatile memory device that transmits data through the buffer memory device,
wherein the system resources comprise a memory resource formed by classifying the non-volatile memory device into at least one namespace.

8. The data storage device of claim 7,
wherein each of the namespaces is physically independent from each other.

9. The data storage device of claim 1,
wherein the performance requirement comprises a bandwidth between the data storage device and an external device.

10. A method of operating a data storage device, the method comprising:
setting, by at least one external device, a performance requirement of each of a plurality of system resources;
determining, by a memory controller, an allocation ratio of buffer slots based on the performance requirement for each of the plurality of system resources;
allocating, by the memory controller, a set number of buffer slots in accordance with the allocation ratio,
setting, by the memory controller, a time limit for providing the allocated set number of buffer slots for each of the plurality of system resources, and
providing, by the memory controller, the allocated set number of buffer slots to associated system resources at regular intervals within the time limit.

11. The method of claim 10,
wherein the memory controller determines the allocation ratio in accordance with performance requirement ratios of the system resources.

12. The method of claim 10,
wherein the plurality of system resources are used solely for a plurality of applications that are performed in at least one external device.

13. The method of claim 10,
wherein the plurality of system resources comprise interface resources.

14. The method of claim 10, further comprising a non-volatile memory device configured to transmit data through the buffer memory device,
wherein the plurality of system resources comprise a memory resource that is formed by classifying the non-volatile memory device into at least one namespace.

15. The method of claim 10,
wherein the performance requirement for each of the plurality of system resources comprises a bandwidth between the data storage device and an external device.

16. A memory controller comprising:
an external device interface circuit configured to communicate with an external device;
a memory interface circuit configured to communicate with a non-volatile memory device; and
a processor and a memory storing instructions, wherein the processor is configured to execute the instructions stored in the memory to perform a method comprising:
determining a performance requirement ratio based on a performance requirement that is set in at least one of the external device interface circuit and the non-volatile memory device;
allocating a set number of buffer slots comprised in a buffer memory to at least one of the external device interface circuit and the non-volatile memory device based on the determined performance requirement ratio;
setting a time limit for providing the allocated set number of buffer slots of the buffer memory for each of at least one of the external device interface circuit and the non-volatile memory device, and providing the allocated set number of buffer slots corresponding to at least one of the external device interface circuit and the non-volatile memory device at regular intervals within the time limit.

17. The memory controller of claim 16, wherein the external device interface circuit comprises a plurality of non-volatile memory express (NVMe) engines that communicate with at least one external device through at least one physical port.

18. The memory controller of claim 16, wherein the non-volatile memory device is classified into at least one namespace logically or physically independent from each other.

* * * * *